(12) United States Patent
Reaves et al.

(10) Patent No.: US 9,178,611 B2
(45) Date of Patent: Nov. 3, 2015

(54) FIBER OPTIC NETWORK INTERROGATION TOOL FOR COMBINED SWEPT-HETERODYNE OPTICAL SPECTRUM ANALYSIS AND OPTICAL FREQUENCY-DOMAIN REFLECTOMETRY

(75) Inventors: Matthew T. Reaves, Christansburg, VA (US); Mark E. Froggatt, Blacksburg, VA (US); Evan M. Lally, Blacksburg, VA (US)

(73) Assignee: Intuitive Surgical Operations, Inc., Sunnyvale, CA (US)

( * ) Notice: Subject to any disclaimer, the term of this patent is extended or adjusted under 35 U.S.C. 154(b) by 14 days.

(21) Appl. No.: 14/130,086

(22) PCT Filed: Jun. 20, 2012

(86) PCT No.: PCT/US2012/043245
§ 371 (c)(1),
(2), (4) Date: Dec. 30, 2013

(87) PCT Pub. No.: WO2013/003141
PCT Pub. Date: Jan. 3, 2012

(65) Prior Publication Data
US 2014/0140691 A1    May 22, 2014

Related U.S. Application Data

(60) Provisional application No. 61/501,963, filed on Jun. 28, 2011.

(51) Int. Cl.
*H04B 10/07* (2013.01)
*H04B 10/071* (2013.01)
*H04B 10/572* (2013.01)
*G01M 11/00* (2006.01)

(52) U.S. Cl.
CPC ......... *H04B 10/071* (2013.01); *G01M 11/3172* (2013.01); *H04B 10/07* (2013.01); *H04B 10/572* (2013.01)

(58) Field of Classification Search
None
See application file for complete search history.

(56) References Cited

U.S. PATENT DOCUMENTS

| | | | |
|---|---|---|---|
| 7,859,654 B2 * | 12/2010 | Hartog | 356/73.1 |
| 2002/0167670 A1 | 11/2002 | Baney et al. | |
| 2005/0012934 A1 * | 1/2005 | Szafraniec | 356/484 |
| 2006/0033927 A1 * | 2/2006 | Froggatt et al. | 356/484 |
| 2006/0120483 A1 | 6/2006 | McAlexander et al. | |
| 2006/0164627 A1 * | 7/2006 | Froggatt et al. | 356/73.1 |
| 2008/0002187 A1 * | 1/2008 | Froggatt | 356/73.1 |
| 2008/0007718 A9 * | 1/2008 | Froggatt et al. | 356/73.1 |

(Continued)

OTHER PUBLICATIONS

International Search Report for PCT/US2012/043245, mailed Jan. 10, 2013.

(Continued)

*Primary Examiner* — Li Liu

(57) ABSTRACT

A multi-function optical tool may be used for example for built-in fault detection and transceiver source characterization in local optical communication networks. A single device provides swept-heterodyne optical spectrum analysis (SHOSA) and optical frequency-domain reflectometry (OFDR) in an efficient, low-cost package by utilizing a common interrogation laser source, common optical components, and common, low-bandwidth acquisition hardware. The technology provides significant cost, space, and labor savings for network maintainers and technicians.

12 Claims, 16 Drawing Sheets

(56) References Cited

U.S. PATENT DOCUMENTS

2008/0024785 A1* 1/2008 Froggatt et al. ............... 356/450
2008/0129983 A1* 6/2008 Mathes et al. ............... 356/73.1
2010/0014071 A1* 1/2010 Hartog ........................ 356/73.1
2010/0097615 A1* 4/2010 Fan et al. ..................... 356/477
2011/0211827 A1* 9/2011 Soto et al. .................... 398/25
2014/0016926 A1* 1/2014 Soto et al. .................... 398/16
2014/0071436 A1* 3/2014 Cyr et al. ..................... 356/73.1

OTHER PUBLICATIONS

Written Opinion of the ISA for PCT/US2012/043245, mailed Jan. 10, 2013.

* cited by examiner

FIBER OPTIC NETWORK INTERROGATION TOOL FOR COMBINED SWEPT-HETERODYNE OPTICAL SPECTRUM ANALYSIS AND OPTICAL FREQUENCY-DOMAIN REFLECTOMETRY

PRIORITY APPLICATION

This application is the U.S. national phase of International Application No. PCT/US2012/043245 filed Jun. 20, 2013 which designated in the U.S. and claims priority from U.S. provisional patent application Ser. No. 61/501,963, filed on Jun. 28, 2011, the contents of which are incorporated herein by reference.

TECHNICAL FIELD

The technology has example application to optical networks and provides a versatile fiber optic network interrogation tool.

INTRODUCTION

Swept-heterodyne optical spectrum analysis (SHOSA) is a known technique for spectral characterization of light sources. Optical frequency-domain reflectometry (OFDR) is a technique to localize faults in fiber optic networks and components with high spatial resolution. Both of these technologies are separately available in commercial products and are commonly used by those skilled in the art of fiber optic networks and communications. It would be desirable to provide the functionality for both SHOSA and OFDR measurements in a single device that is selectively configurable to provide the functionality for either SHOSA or OFDR, depending on the user's need. Even more desirable to network operators would be such a configurable device that can be installed in-line with existing optical networks in order to provide continuous SHOSA and OFDR measurement capabilities without disrupting ongoing network operations. Such a device would enable real-time network health monitoring capabilities, continuously monitoring the integrity of both network optical components and light sources.

The commonalities between these two technologies permit an efficient marriage of these two dissimilar measurement tools into a single, low-cost instrument, described herein by the inventors. Such a dual-purpose tool has the potential to significantly reduce the time and cost involved with network inspection and troubleshooting.

SUMMARY

A multi-purpose device is provided for optical network loss measurements and light source characterization. The device includes an optical interrogation system including an interrogating laser source, an optical interferometric interrogator network, and optical detection circuitry. The device further includes an operational mode controller arranged to permit selective configuration of the optical interrogation system to perform optical frequency-domain reflectometry (OFDR) in a first operational mode and to perform swept-heterodyne optical spectrum analysis (SHOSA) in a second operational mode. The multi-purpose device may be contained in a single housing.

In a non-limiting example embodiment, the operational mode controller includes a first optical switch in the optical interferometric interrogator network, which when switched to a first state, selects the first operational mode, and when switched to a second state, selects the second operational mode. The optical interferometric interrogator network includes a reference optical path and a measurement optical path coupled to a device under test. The optical switch is configured to couple the interrogating laser source to the device under test via the measurement path in the first operational mode and to disconnect the measurement path between the interrogating laser source and the device under test path in the second operational mode.

In this example embodiment, the optical interferometric interrogator network includes two input/output ports joined to the interferometric network via a 2×2 bidirectional tap coupler and a second optical switch. The two input/output ports are connected to two opposite leads of the 2×2 bidirectional tap coupler, and the remaining two leads of the 2×2 bidirectional tap coupler are connected to the second optical switch. The 2×2 bidirectional tap coupler is preferably connected to the input/output ports such that a majority of the power entering either input/output port from outside of the device continues on to the opposite input/output port to permit the device to be connected in-line with a communications network while tapping a minority of that power. As a non-limiting example, the majority of the power is 80% or greater of the power and the minority of the power is 20% or less of the power.

In this example embodiment, the second optical switch may be a single-pole, double-throw (SPDT) switch, in which case, a portion of light from either input/output port is coupled to one of the two throws of the SPDT switch via the corresponding lead of the bidirectional tap coupler. One input/output port is coupled to one throw, and the opposite input/output port is coupled to the opposite throw to allow a user to probe two different input light sources and/or networks from opposite input/output ports by selecting a corresponding switch position of the SPDT switch.

In another example embodiment, the optical interrogation system further includes a system controller, coupled to the interrogating laser source and the optical detection circuitry, and a display or data output interface coupled to the system controller.

In yet another example embodiment, the optical interrogation system further includes a tunable laser monitor network coupled to the interrogating laser source and the optical detection circuitry.

Another aspect of the technology is an optical network that includes a single optical interrogation device configured to selectively perform optical frequency-domain reflectometry (OFDR)-based optical measurements and swept-heterodyne optical spectrum analysis (SHOSA)-based measurements using common circuitry.

Another aspect of the technology is a method for selectively perform optical frequency-domain reflectometry (OFDR)-based optical measurements and swept-heterodyne optical spectrum analysis (SHOSA)-based measurements using a common circuitry and a single optical interrogation device. A single optical interrogation device to perform OFDR in a first operational mode and to perform SHOSA in a second operational mode is provided. The optical interrogation system includes an interrogating laser source, an optical interferometric interrogator network, and optical detection circuitry. One of the operational modes is selected, and optical network loss measurements are made or a light source is characterized using the single optical interrogation device based on the selected operational mode.

DETAILED DESCRIPTION

Figure 1:
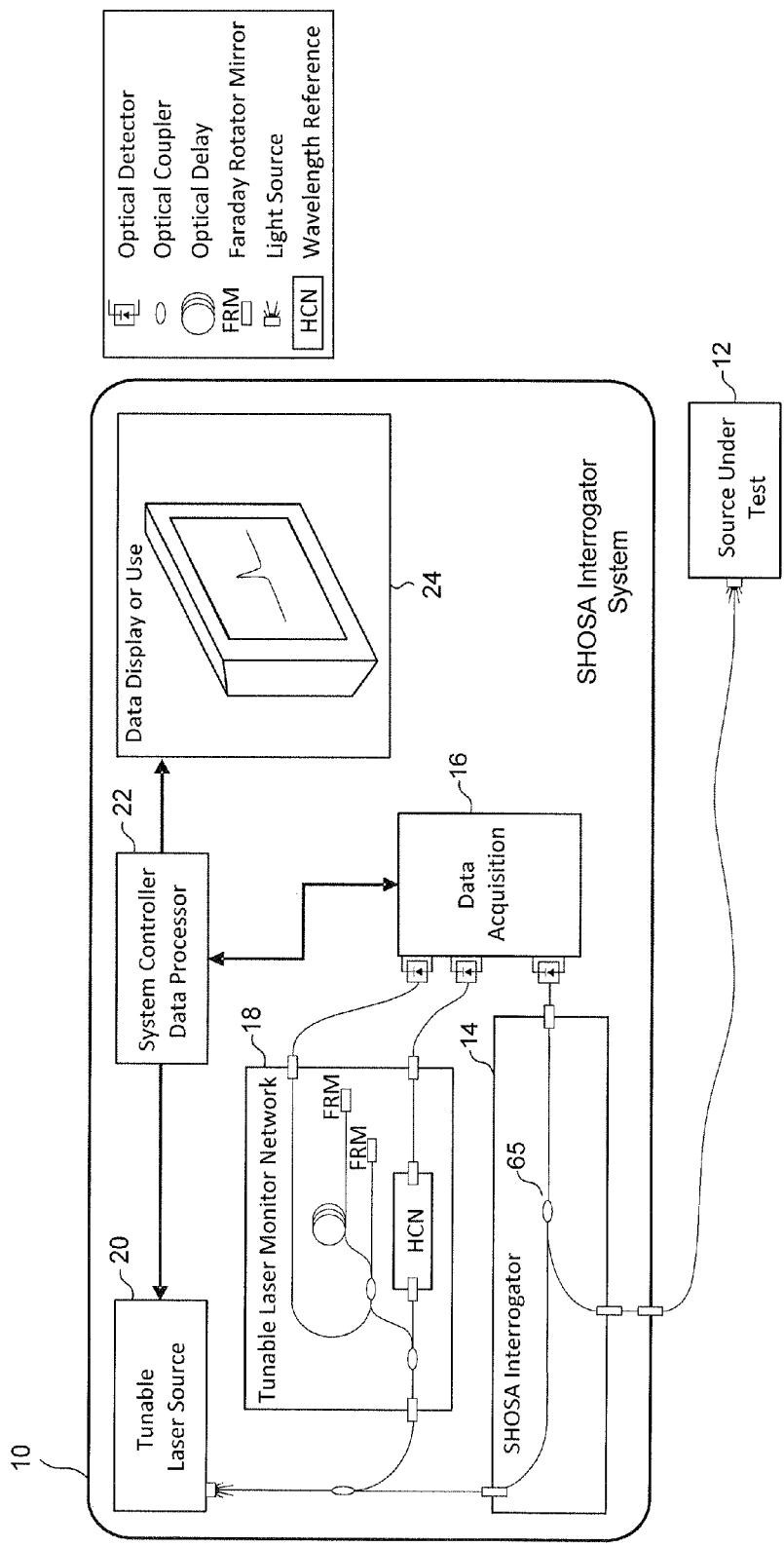
FIG. 1 shows a function block diagram for an example SHOSA interrogation system.

The following description sets forth specific details, such as particular embodiments for purposes of explanation and not limitation. But it will be appreciated by one skilled in the art that other embodiments may be employed apart from these specific details. In some instances, detailed descriptions of well known methods, interfaces, circuits, and devices are omitted so as not to obscure the description with unnecessary detail. Individual blocks are shown in the figures corresponding to various nodes. Those skilled in the art will appreciate that the functions of those blocks may be implemented using individual hardware circuits, using software programs and data in conjunction with a suitably programmed digital microprocessor or general purpose computer, and/or using application-specific integrated circuitry (ASIC), and/or using one or more digital signal processors (DSPs). Software program instructions and data may be stored on a non-transitory, computer-readable storage medium, and when the instructions are executed by a computer or other suitable processor control, the computer or processor performs the functions associated with those instructions.

Thus, for example, it will be appreciated by those skilled in the art that diagrams herein can represent conceptual views of illustrative circuitry or other functional units. Similarly, it will be appreciated that any flow charts, state transition diagrams, pseudocode, and the like represent various processes which may be substantially represented in computer-readable medium and so executed by a computer or processor, whether or not such computer or processor is explicitly shown.

The functions of the various illustrated elements may be provided through the use of hardware such as circuit hardware and/or hardware capable of executing software in the form of coded instructions stored on computer-readable medium. Thus, such functions and illustrated functional blocks are to be understood as being either hardware-implemented and/or computer-implemented, and thus machine-implemented.

In terms of hardware implementation, the functional blocks may include or encompass, without limitation, a digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

The technology conceived by the inventors advantageously combines swept-heterodyne optical spectrum analysis (SHOSA) and optical frequency-domain reflectometry (OFDR) in an efficient, low-cost package by utilizing a common interrogation laser source, common optical components, and common, low-bandwidth acquisition hardware. Such a device may be installed in-line with optical networks (existing and future) allowing for built-in network monitoring capabilities such as for example fault detection and transceiver source characterization in optical communication networks. In addition to significant cost and size savings, the technology system also provides significant labor savings for network maintainers and technicians.

HETERODYNE OPTICAL SPECTRUM ANALYSIS (HOSA). As mentioned in the introduction, optical heterodyne detection is a technique for spectral characterization of light sources and is similar to heterodyne detection commonly used in radio communications. In both, a known source, termed the "local oscillator" (LO), is mixed at a detector with a source-under-test (SUT). The mixing process is nonlinear, producing a signal that is proportional to the square of the field amplitude at the detector. In optical heterodyne detection, the fields are mixed at a photodiode, which is inherently nonlinear, responding only to power (proportional to the square of the amplitude) of the incident field. The nonlinear mixing process produces an output signal with a component that oscillates at the difference (beat) frequency between the LO and SUT. The output signal also contains high-frequency and DC terms that are typically discarded through filtering. Detection of the beat frequency provides a means for a high-frequency SUT to be "interrogated" using low-bandwidth detection hardware. In the optical regime, a SUT operates at frequencies on the order of 100 THz. By tuning the LO to operate near the frequency of the SUT, the beat signal is "mixed down" to near DC.

If the LO and SUT operate at frequencies $v_{LO}$ and $v_S$ with field amplitudes $A_{LO}$ and $A_S$, respectively, the fields can be represented as follows:

$$E_{LO}(t)=A_{LO}\cos(2\pi v_{LO}t+\phi_{LO})$$

$$E_S(t)=A_S\cos(2\pi v_S t+\phi_S) \quad (1)$$

where $\phi_{LO}$ and $\phi_S$ represent the initial phases of the respective fields. The detected signal $P_{DET}$ then has the form $$P_{DET}(t) = [E_{LO}(t) + E_S(t)]^2 = \quad (2)$$
$$\frac{A_{LO}^2}{2} + \frac{A_S^2}{2} + A_{LO}A_S\cos[2\pi(v_S - v_{LO})t + (\varphi_S - \varphi_{LO})] +$$
$$A_{LO}A_S\cos[2\pi(v_S + v_{LO})t + (\varphi_S - \varphi_{LO})] +$$
$$\frac{A_{LO}^2}{2}\cos[2(2\pi v_{LO}t + \varphi_{LO})] + \frac{A_S^2}{2}\cos[2(2\pi v_S t + \varphi_S)]$$

Equation 2 describes the detected analog signal after nonlinear mixing of the fields. The first two terms represent the DC contribution from the two fields. The third term oscillates at the beat frequency and is the term of interest. The last three terms are high-frequency terms that oscillate at or near twice the field frequency. For optical fields, these terms oscillate around 100-500 THz, which is beyond the detection capabilities of any available electronics. Thus these terms are currently not detectable. In typical applications, the detection hardware is AC-coupled, and only the beat frequency signal is passed. In operation, the detected signal becomes $$P_{DET}(t) \approx A_{LO}A_S \cos[2\pi(v_S-v_{LO})t+(\phi_S-\phi_{LO})] \quad (3)$$

For a broadband source, the beat signal is equally broadband, since each frequency component of the SUT contributes a unique beat frequency in the mixed signal. A SUT with a relatively narrow linewidth of 2 pm in the C-band corresponds to an optical bandwidth of approximately 250 MHz. Common VCSEL sources for DWDM optical communications emit 10-20 discrete laser lines spanning a total bandwidth of 20 nm (250 GHz). Traditional heterodyne techniques cannot be used for broadband sources since the required detection bandwidth grows with the bandwidth of the SUT. In order to interrogate such sources, a technique known as stepped-, swept-, or super-heterodyne optical spectrum analysis (SHOSA) can be used.

In SHOSA, the frequency of the LO is swept through the bandwidth of the SUT during acquisition. At each step of the LO, the large-bandwidth beat signal is filtered heavily, allowing only the beat signal near DC to pass. Thus, at any step of the LO, only the component of the SUT that oscillates at the LO frequency is passed. As the LO sweeps across the SUT, the detected signal is oscillatory, with a phase that depends on the phase relationship between the LO and SUT at each frequency step. The envelope of the acquired oscillatory signal can be extracted to yield the power spectrum of the SUT. In this technique, the spectral resolution of the measurement depends on the linewidth of the LO source and the bandwidth of the imposed filters. The LO is typically chosen to have a linewidth much narrower than the SUT and filter bandwidths. Thus, it is typically assumed that the contribution of the LO linewidth on measurement resolution is negligible. For example, a 20 MHz filter bandwidth can provide spectral resolution on the order of 160 fm, which is sufficient for high-resolution characterization of laser diodes used in optical communications. Higher resolution can be obtained by imposing tighter filters. The maximum detectable SUT bandwidth is dependent on the tuning range of the LO. Swept laser sources are commercially available with a tuning range of 80 nm around the C-band.

Mathematically, the detected beat signal from a broadband source using a SHOSA technique is given by:

$$P_{DET}(v_{LO},t) \approx A_{LO}(v_{LO}) \int_{-\infty}^{\infty} A_S(v')F(v'-v_{LO})\cos[2\pi(v'-v_{LO})t+\phi_S(v')-\phi_{LO}(v_{LO})]dv' \quad (4)$$

Here, the integral is performed over the bandwidth of the SUT, and the function $F(v'-v_{LO})$ represents the frequency response of the imposed filter. In the limiting case where $F(v'-v_{LO}) \to \delta(v'-v_{LO})$, where $\delta$ represents a Dirac delta function at DC, the detected signal becomes:

$$P_{DET}(v_{LO}(t)) \approx A_{LO}(v_{LO})A_S(v_{LO})\cos[\phi_S(v_{LO})-\phi_{LO}(v_{LO})] \quad (5)$$

As stated previously, the detected signal has a phase $\phi_S(v_{LO})-\phi_{LO}(v_{LO})$ that depends on the phase relationship between the LO and the SUT. The envelope $A_{LO}(v_{LO})A_S(v_{LO})$ can be extracted to yield the power spectrum of the SUT.

FIG. 1 shows a system diagram for a SHOSA interrogation unit using a tunable laser source (TLS) 20 as the LO. A trigger signal from the system controller data processor 22 synchronizes the TLS sweep circuitry (built-into the TLS) and data acquisition circuitry 16. The interrogating TLS is swept through the optical bandwidth of the SUT 12. A portion of the TLS power is split into a separate tunable laser monitor network 18 to monitor the wavelength of the TLS output. The remainder of the power from the TLS is mixed with the SUT at an optical coupler 65 in a SHOSA interrogator network 14, and the heterodyne beat signal is detected at a photodiode of the data acquisition circuitry 16. The output of the laser monitor network 18, also detected at photodiodes of the data acquisition circuitry 16, provides an absolute wavelength registration of the TLS and is used to correct the acquired SUT interrogator signal for nonlinearities in the TLS sweep. This ensures that the acquired signal is represented in equal increments of optical frequency. The envelope of the detected SUT interrogator signal is determined by processing in the system controller data processor 22, providing a measure of the power spectrum of the SUT 12 relative to the TLS local oscillator 20. The power spectrum of the TLS 20 may be measured on initialization, or during the course of each scan by a separate power monitor photodiode and circuit, providing a calibration correction that scales the determined envelope into an absolute power spectrum.

The fiber-optic-based SHOSA interrogation technology may also be implemented in a free-space optical system by replacing the fiber optic couplers with non-polarizing beamsplitters and using appropriate collimating optics.

Figure 2:
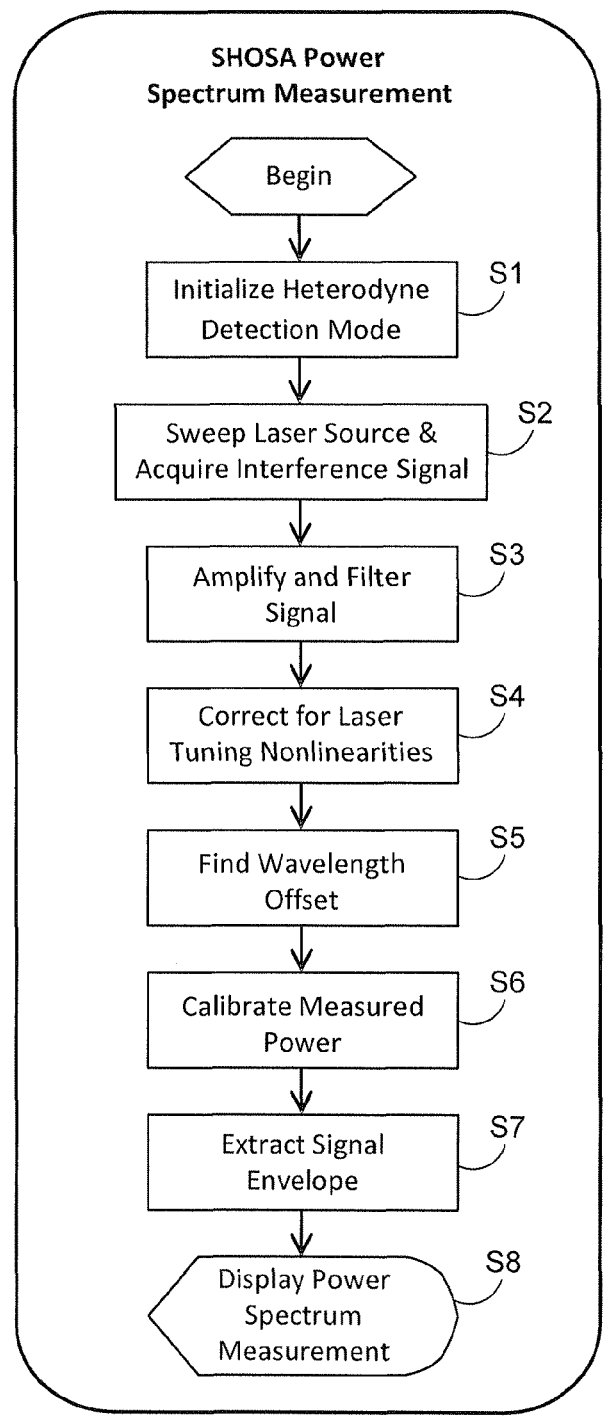
FIG. 2 is a flowchart diagram illustrating example procedures for a SHOSA interrogation measurement.

FIG. 2 provides a non-limiting example flowchart for a typical SHOSA measurement. Step S1 initializes the heterodyne detection mode. S1 would include calibration measurements, memory allocation, laser initialization, and any other procedures that must be accomplished before the SHOSA measurement is made. The TLS is then swept over a desired range of wavelengths and the resulting interference signals are detected at the data acquisition photodiode (step S2). The detected interference signal is amplified and filtered (step S3), and corrected for laser tuning nonlinearities (step S4). The system controller 22 determines and applies an absolute wavelength offset based on the output from the wavelength reference of the laser monitor network 18 to ensure the start wavelength of data output is consistent between measurements and to account for any drift of the TLS 20 (step S5). A calibration scaling is then applied to the filtered signal (step S6), and the signal envelope is extracted (step S7) corresponding to the power spectrum of the SUT. That power spectrum of the SUT may be displayed or otherwise utilized as desired (step S8).

OPTICAL FREQUENCY-DOMAIN REFLECTOMETRY. Optical frequency-domain reflectometry (OFDR) is a technique used to localize faults in fiber optic networks and components with high spatial resolution. This technique allows detection of loss and component failure over intermediate ranges (<2 km) with spatial resolution of 1 mm or better and zero dead zone. OFDR is well-suited for component-level and local area network (LAN) testing. Optical time-domain reflectometry (OTDR) is an alternative technology that is commonly used for long-haul fiber optic network testing, providing increased range (10-100 km) but with limited spatial resolution (typically 5 cm-5 m with a dead zone of 3-10 m).

In OFDR, light from a swept laser source is split between a reference path and a measurement path of a Mach-Zender interferometer. The measurement path contains the device-under-test (DUT) or network-under-test (NUT). Light reflected down the length of the network is combined again with light from the reference path, producing an interference pattern detected at a photodetector. When the tunable laser is swept linearly through optical frequency, reflection events in the DUT produce tone components in the detected interference signal with frequencies proportional to the path difference between the reference path length and the measurement path length of a given reflection event. A Fourier transform is performed on the detected signal to map the location, amplitude, and phase of reflection events to transform frequency components.

Figure 3:
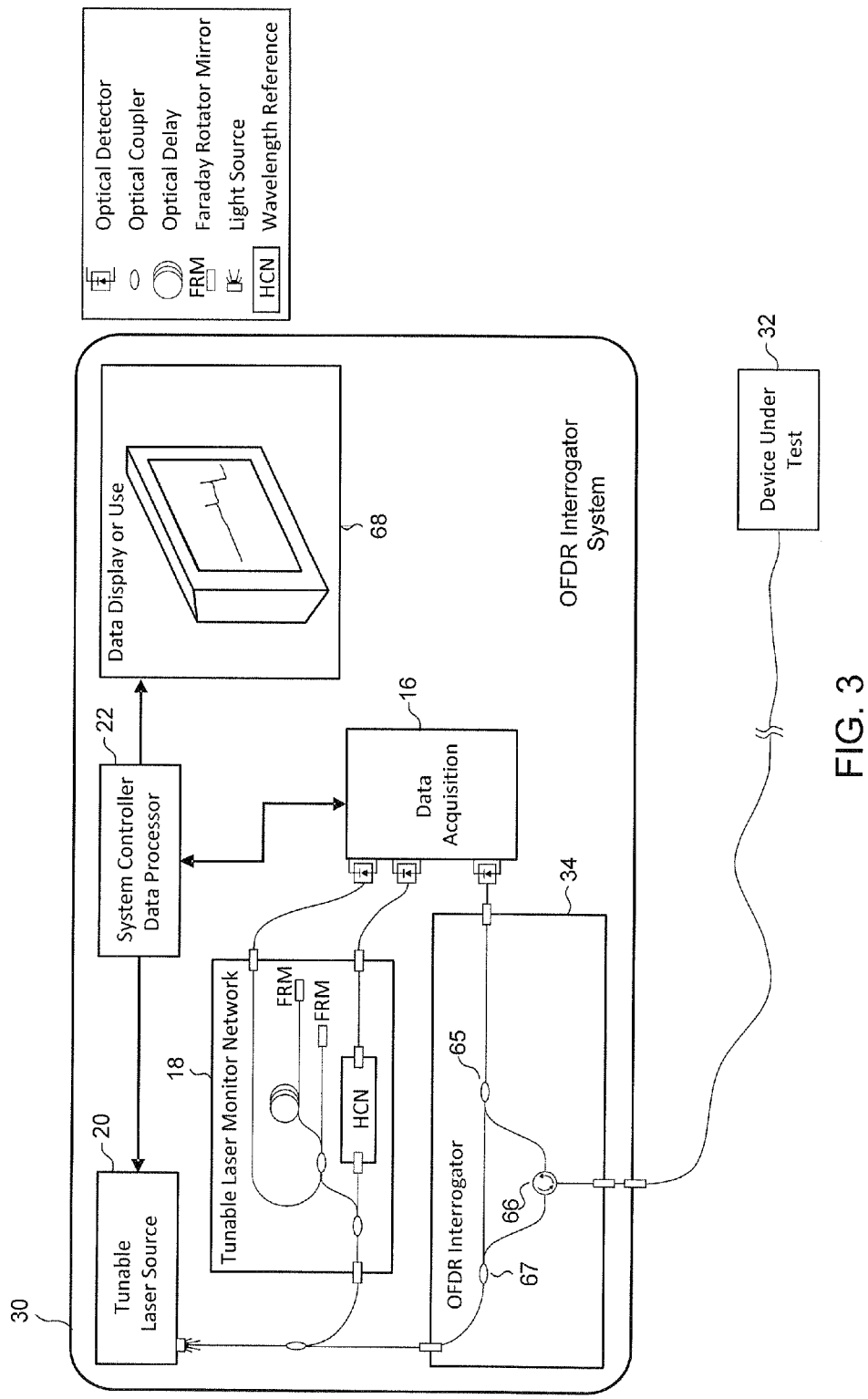
FIG. 3 shows a function block diagram for an example OFDR interrogation system.

FIG. 3 shows a function block diagram for an example fiber optic OFDR interrogation system. The inventors discovered its similarity to the SHOSA system shown in FIG. 1. To make this clear, similar elements to those in FIG. 1 are labeled with the same numbering scheme in FIG. 3. A TLS 20 is swept through optical frequency, and a trigger signal from the system controller data processor 22 is used to synchronize the TLS sweep and the data acquisition circuitry 16. A portion of the TLS power is split into a separate network to monitor the wavelength of the TLS. The remainder of the TLS power enters the OFDR interrogator network 34 where it is split at an optical coupler 67 between the reference path and the measurement path containing the device under test (DUT) 32. The measurement path contains an optical circulator 66 that ensures only light reflected from the path containing the DUT enters the return path of the interferometer. Light reflected from the DUT is then mixed with light from the reference path at an optical coupler 65, producing an interference pattern which is detected at a photodetector of the data acquisition circuitry 16. The output of the laser monitor network 18 is used to provide an absolute wavelength registration of the TLS and to correct the acquired signal for nonlinearities in the TLS sweep. The system controller data processor 22 performs a fast Fourier transform (FFT) on the detected signal during post-processing to map the location, amplitude, and phase of reflection events directly to transform frequencies. The amplitude information provides a direct measurement of loss in the DUT 32.

Although OFDR is most common in fiber optic applications, it is possible to implement the technology in a free-space optical configuration. This may be accomplished by replacing the circulator and fiber optic couplers with non-polarizing beam splitters and incorporating appropriate collimating optics and optical isolators to maintain the optical path configuration described above.

Figure 4:
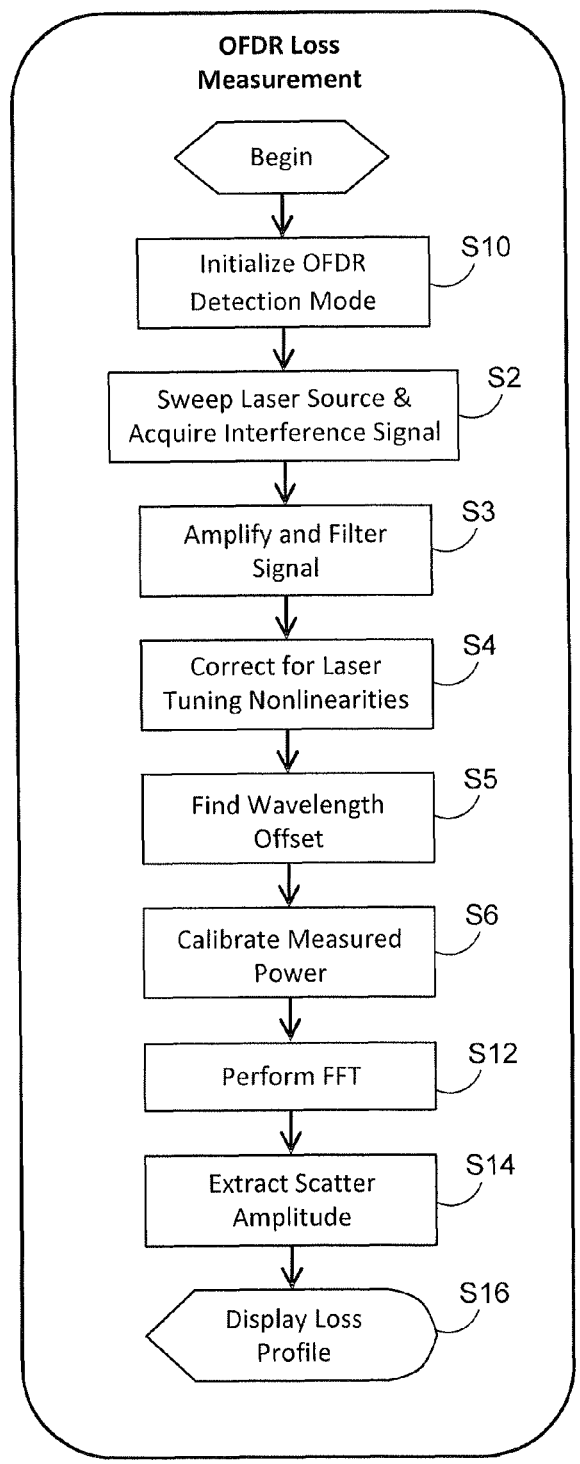
FIG. 4 is a flowchart diagram illustrating example procedures for a OFDR interrogation measurement.

FIG. 4 is a flowchart diagram illustrating example procedures for an OFDR interrogation measurement where similar steps to those in FIG. 2 are labeled the same. Step S1 initializes the OFDR detection mode. S1 would include calibration measurements, memory allocation, laser initialization, and any other procedures that must be accomplished before the OFDR measurement is made. The TLS is swept over a desired range of wavelengths and the resulting interference signals are detected at the data acquisition photodiode (step S2). The detected interference signal is amplified and filtered (step S3), and corrected for laser tuning nonlinearities (step S4). The system controller 22 determines and applies an absolute wavelength offset based on the output from the wavelength reference of the laser monitor network 18 to ensure the start wavelength of data output is consistent between measurements and to account for any drift of the TLS 20 (step S5). A calibration scaling is then applied to the filtered signal to ensure loss measurements are accurately reported (step S6). An FFT is performed on the calibrated power (step S12), and the scatter amplitude is extracted (step S14). This maps the location, amplitude, and phase of reflection events directly to transform frequencies. The amplitude information provides a direct measurement of loss in the DUT 32. A loss profile may then be displayed (step S16) to allow a user to detect and localize faults in the DUT including poor splices, broken fibers, faulty components, and tight bends. These faults can then be serviced as necessary.

Current commercial OFDR systems have a dynamic range on the order of 70 dB with −130 dB sensitivity. This allows for reliable measurements of Rayleigh backscatter and strong reflections with high spatial resolution, enabling the user to distinguish between loss due to optical connectors, splices, network components, and tight bends.

Figure 5:
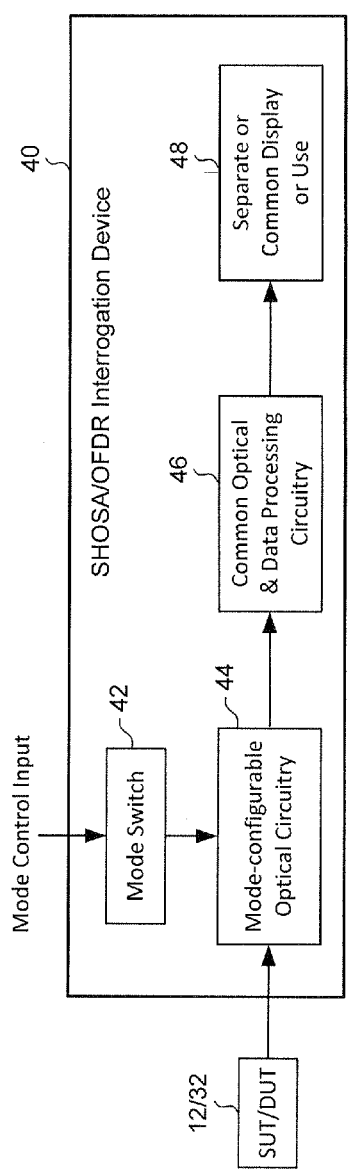
FIG. 5 is a non-limiting example embodiment of a combined SHOSA/OFDR interrogation device.

The inventors combined these separate OFDR and SHOSA devices into a single interrogation device. FIG. 5 is a non-limiting example embodiment of a combined SHOSA/OFDR interrogation device 40. A SUT 12 and/or DUT 32 is coupled to an input port of the SHOSA/OFDR interrogation device 40. The input is connected to mode-configurable optical circuitry 44, which based on an input from a mode switch 42 controlled by a mode control input (human or machine input), determines whether the device 40 operates as a SHOSA interrogation device or an OFDR interrogation device. The output from the mode-configurable optical circuitry 44 is provided to common optical and data processing circuitry 46. The processed output is then presented on a common display device 48 or it may be integrated directly with an existing network health monitoring architecture.

Figure 6:
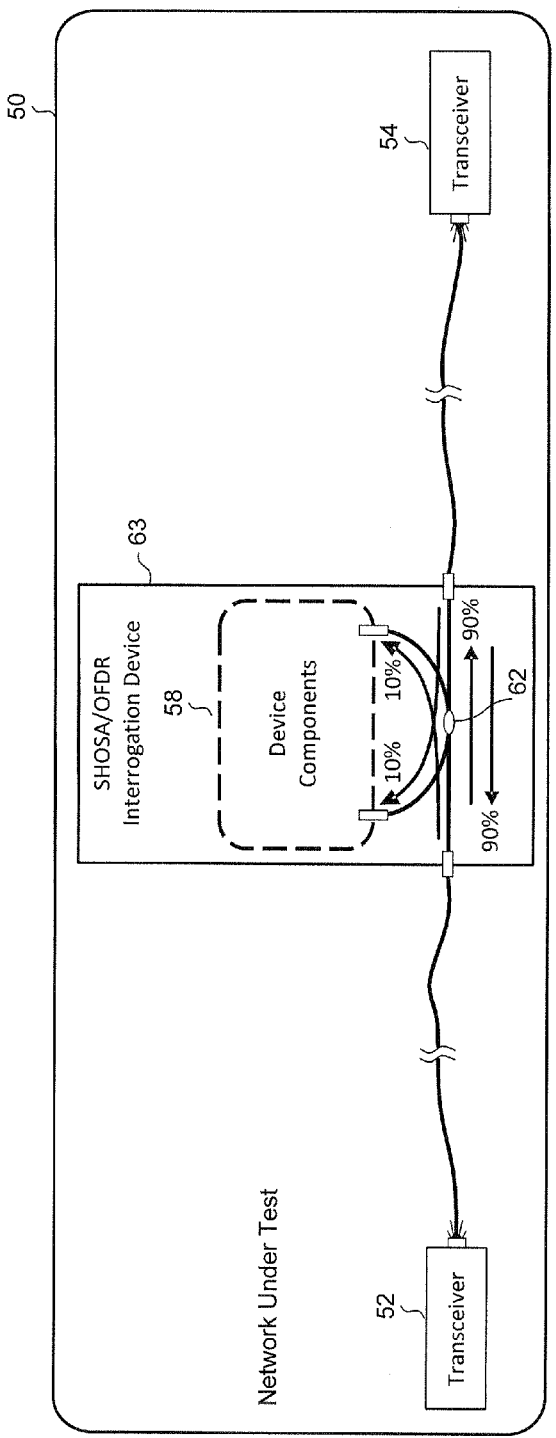
FIG. 6 is a non-limiting example embodiment of a combined SHOSA/OFDR interrogation device installed directly in-line with existing fiber optic communications network.

Advantageously, the device described above may be installed in-line with a fiber optic network, e.g., a local area network, to provide a comprehensive solution for optical network testing and characterization. FIG. 6 is a non-limiting example embodiment of a combined SHOSA/OFDR interrogation device 63 installed in-line with existing fiber optic communications network. The combined SHOSA/OFDR interrogation device 63 connects, in this example, two transceivers 52 and 54 and includes device components 58 which are detailed in FIG. 8. Only a small amount of power (1-20%) is tapped from the existing network to provide continuous SHOSA measurements of the network transceiver sources without interfering with ongoing network communication operations. The additional OFDR measurement capability allows for periodic network monitoring and fault localization. The combination of these two technologies provides additional insight and allows for faster, more informed trouble-shooting for network technicians and maintainers.

The common circuitry 46 in the combined SHOSA/OFDR interrogation device includes a single tunable laser that acts as both a heterodyne LO and an OFDR interrogation source. In one non-limiting example embodiment, a user may choose between the two modes of operation through a single-pole, single-throw (SPST) fiber optic switch placed in the leading measurement arm of an OFDR network prior to the optical circulator 66. Alternatively, an optical modulator or other device may be used (rather than the switch) that produces a controlled and reversible obstruction to light traveling in the leading measurement arm of the OFDR network. The SHOSA/OFDR interferometric techniques share a common reference path and are measured using common detection hardware. This efficient design results in a cost-effective and versatile test instrument for the fiber optic communications industry, allowing the user to make measurements of optical loss, fault localization, and optical source characterization with a single, low-cost instrument. In addition, the device can be installed in-line with an existing telecommunications network without disrupting ongoing network communications, thus minimizing wear on optical connectors and extending the life of network components.

Figure 7:
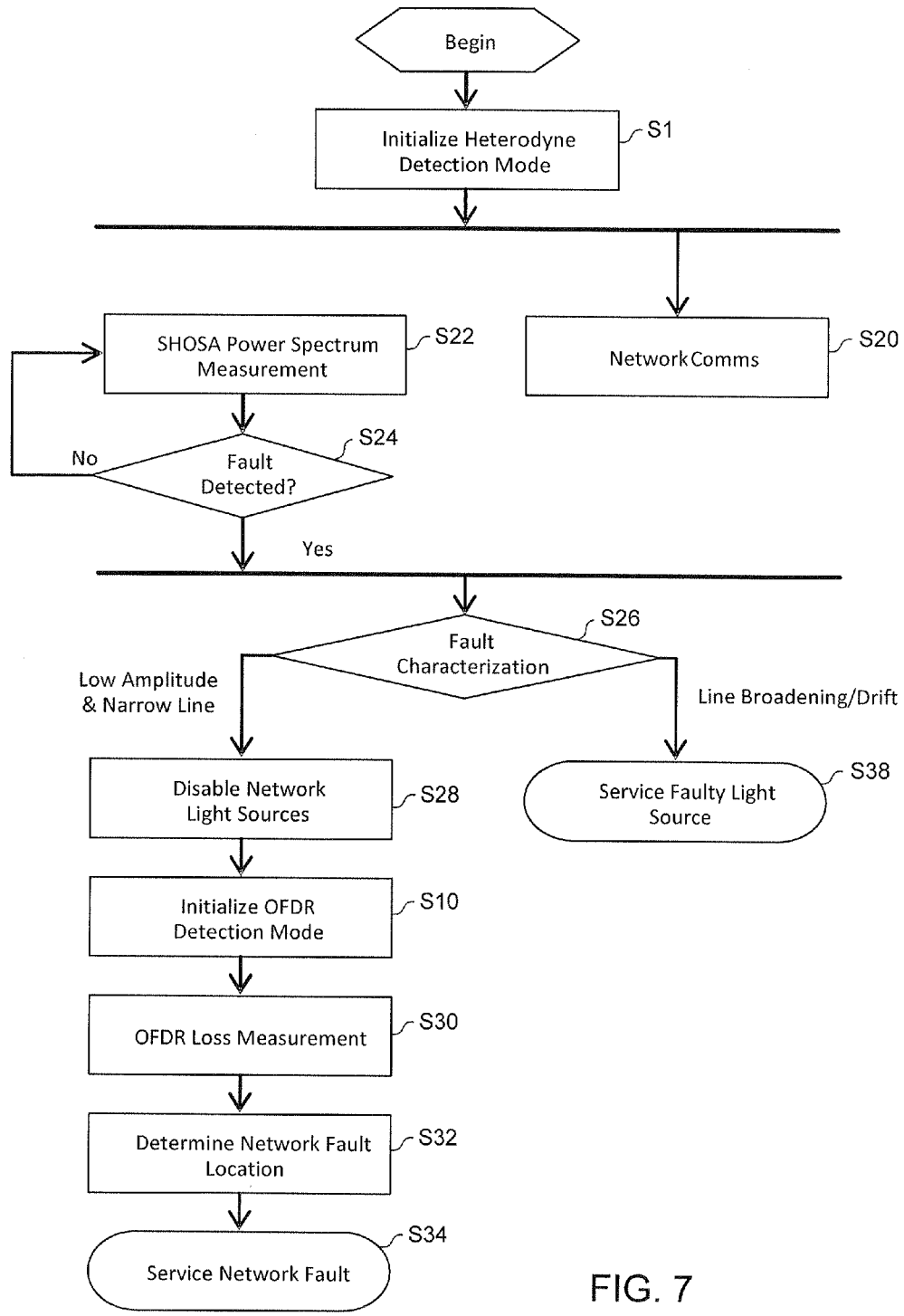
FIG. 7 is a flowchart showing example procedures for a combined SHOSA/OFDR interrogation system for monitoring of fiber optic communications networks.

FIG. 7 is a flowchart showing example procedures for a combined SHOSA/OFDR interrogation system for monitoring of fiber optic communications networks. After the system is installed into an existing network, it is likely, though not necessary, that the system will operate in SHOSA detection mode for the much of the time, so the flowchart in FIG. 7 begins by initializing heterodyne detection mode (step S1). SHOSA measurements are repeated continuously (step S22) in parallel with network communication operations (step S20) using a switch to alternate between network transceiver sources, as described below. These parallel operations continue until a fault is detected in the characterization of a network source (step S24). Example faults include signal loss, line broadening, excess jitter, and/or drift. Once detected, the fault is characterized in software to inform network maintainers of the likely fault source (step S26). For example, excessive drift, jitter, or broadening may be attributed to a fault in the transceiver light source. However, signal loss may be associated either with source failure or a network fault. When signal loss is due to source failure, there is an associated broadening of the source linewidth. This broadening does not occur when signal loss is due to a network fault. Rather, in the case of a network fault, the linewidth remains narrow while the amplitude drops.

If the fault source is determined to be a transceiver light source, the source is serviced (step S38). If the fault source is determined to be in the communications network, the network transceiver sources are disabled (step S28), and the system may be re-initialized in OFDR detection mode (step S10). An OFDR measurement is made (step S30), and the location of the fault source can be determined to within a few millimeters (step S32). Once located, the network maintainer/technician can take appropriate action to service the faulty network component (step S34).

The operational implementation described above saves many man-hours of network trouble-shooting. Network technicians and maintainers often use OFDR or OTDR to find network faults and optical spectrum analyzers (OSAs) to characterize transceiver source performance. The technology described here combines these two technologies into one powerful, cost-effective tool. In addition, the in-line nature of the instrument enables built-in, automated monitoring of network health.

Figure 8:
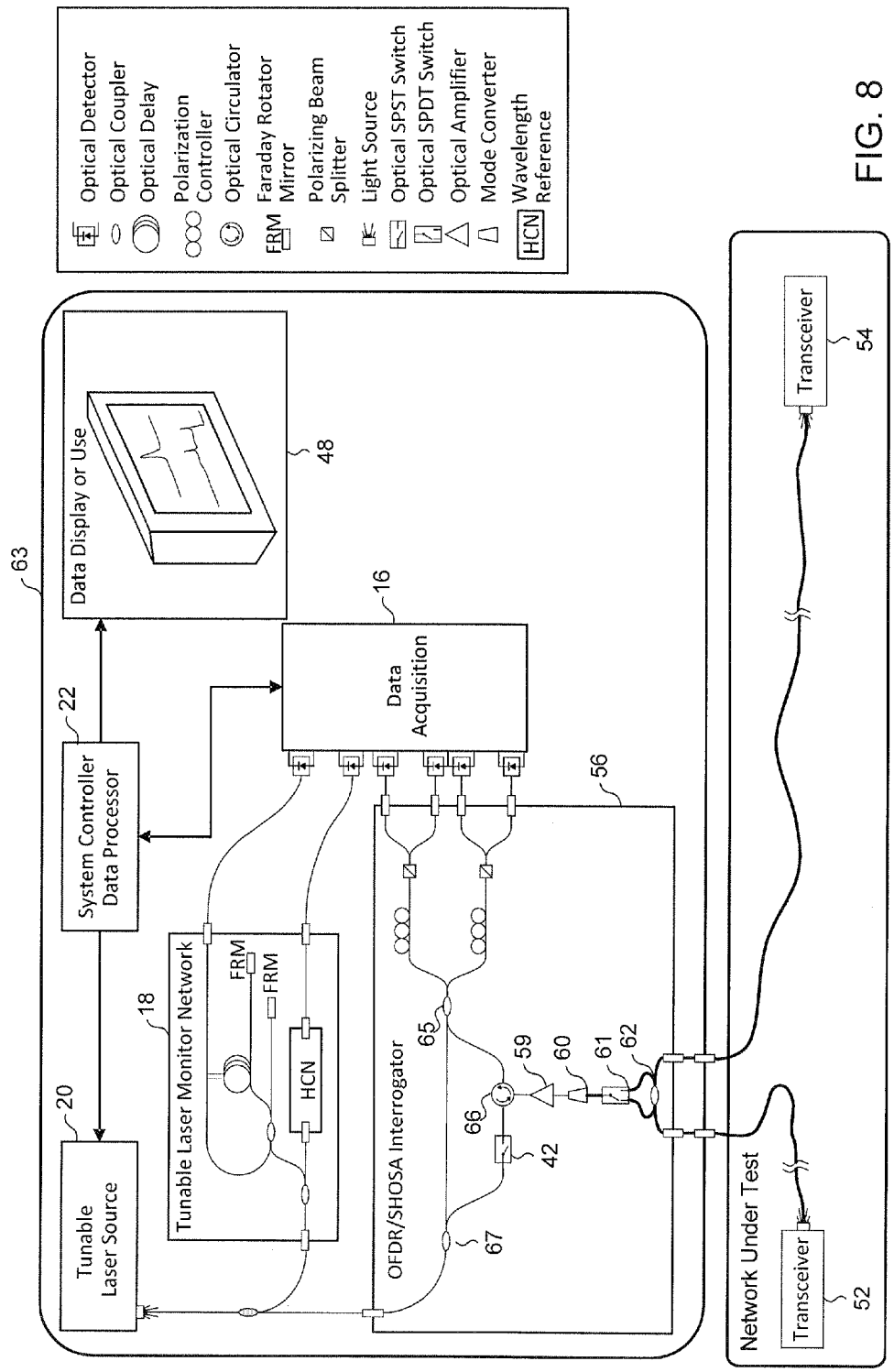
FIG. 8 is a non-limiting example embodiment of a combined SHOSA/OFDR interrogation system for in-line inspection of high-speed multimode local optical communication networks.

FIG. 8 is a non-limiting example embodiment of a combined SHOSA/OFDR interrogation system 63 for in-line inspection of high-speed multimode local communication networks represented by the two transceivers 52 and 54 in the network under test. A TLS 20 is used as a common source for both SHOSA and OFDR interrogation. A portion of the laser TLS power is split at an optical coupler into a separate laser monitor network 18. Within the laser monitor network 18, the TLS signal is split again into two separate paths at an optical coupler 67. In one path, the signal passes through a hydrogen cyanide gas cell (HCN) which serves as an absolute wavelength reference. The output from the gas cell (HCN) is detected at a photodetector coupled to the data acquisition circuitry 16 and shows discrete absorption lines at wavelengths dependent on the gas cell used. The second path in the laser monitor network serves as the source of a Michelson interferometer used to monitor and correct for tuning nonlinearities of the TLS.

Figure 9:
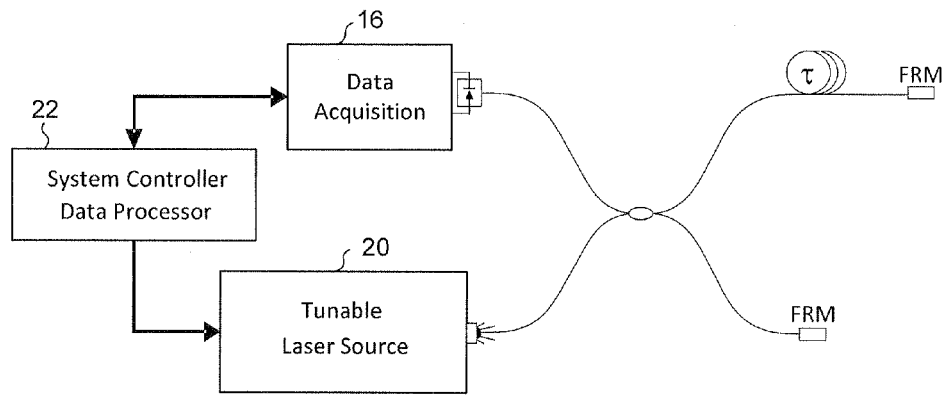
FIG. 9 is a diagram of a Michelson laser monitor interferometer used for measurement of TLS tuning.

A simplified diagram of a Michelson interferometer is shown in FIG. 9. The TLS 20 is split at a 2×2 optical coupler into two paths, each terminated with a Faraday rotator mirror (FRM). The FRMs act as phase-conjugate mirrors, and the return path of each arm is automatically compensated for any induced birefringence experienced on the forward path. The two arms of the interferometer have a relative path delay $\tau$, and an interference signal is produced when the two paths are recombined at the 2×2 coupler. As the TLS sweeps through optical frequency, the AC-coupled interference signal has zero-crossings each time the TLS frequency has accumulated one free spectral range (FSR) of the interferometer, given by $$\frac{1}{\tau}.$$

The irregularity of zero-crossings provides a measure of the TLS tuning nonlinearity, and this measurement is used to resample the time-acquired OFDR or SHOSA signals in terms of equal increments of optical frequency.

Figure 10:
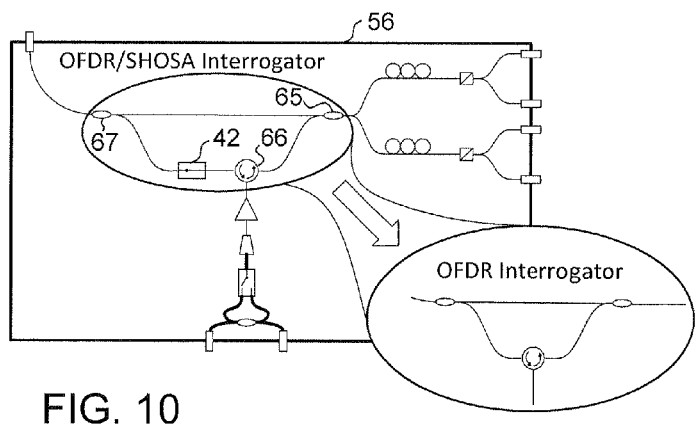
FIG. 10 is a non-limiting example embodiment of a combined SHOSA/OFDR interrogation system operating in OFDR interrogation mode.

Returning to FIG. 8, the remainder of the signal from the TLS 20 is input into the multi-purpose SHOSA/OFDR interrogator network 56. At the input, the signal is split at an optical coupler 67 into two paths. The upper path serves as a common reference path for both SHOSA and OFDR detection. The lower path enters a SPST fiber optic switch 42 which is used to select between SHOSA and OFDR operational modes. When the switch 42 is closed, the SHOSA/OFDR interrogator network 56 allows the system 63 to behave as a standard OFDR measurement device, (see FIG. 10), allowing for fault and loss localization measurements in the network under test (NUT). In this OFDR mode of operation, the network transceiver sources are either disabled, or the TLS 20 is operated outside the transceiver transmission band. Because OFDR measurements are typically used for fault localization, it is reasonable to assume that the transceiver sources can be disabled for the duration of an OFDR measurement.

Figure 11:
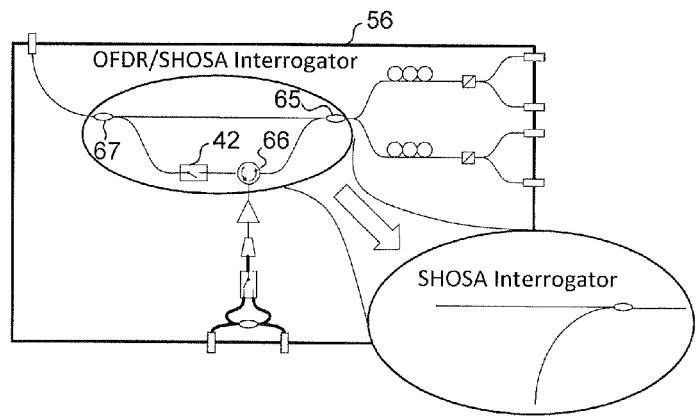
FIG. 11 is a non-limiting example embodiment of a combined SHOSA/OFDR interrogation system operating in SHOSA interrogation mode.

When the SPST switch 42 is open, the measurement path of the Mach-Zender interferometer is broken so that the TLS 20 is mixed directly with a network transceiver source for SHOSA characterization of transceiver source quality. Alternatively, the switch 42 may be replaced with an optical modulator or other device that produces a controlled and reversible obstruction in the leading measurement arm of the OFDR network. FIG. 11 is a non-limiting example embodiment of a combined SHOSA/OFDR interrogation system operating in an SHOSA interrogation mode of operation with the SPST switch in the open position.

Beyond the optical circulator 66, there is an optical amplifier 59, a mode converter 60, a multimode SPDT fiber optic switch 61, and a 2×2 multimode tap coupler 62 as shown in FIG. 8. The two throws of the multimode SPDT fiber optic switch 61 are connected to two opposing arms of the tap coupler 62. The remaining two arms of the coupler 62 are connected in-line with a multimode communications network represented here with transceivers 52 and 54. The tap coupler 62 preferably has a weak tapping ratio (e.g., about 1-20%) and is bidirectional. Thus, about 1-20% of light from the transceiver 52 couples into one throw of the fiber optic switch 61, while the remaining 80-99% continues on to the opposing transceiver 54. Similarly, about 1-20% of light from the transceiver 54 couples into the other throw of the fiber optic switch 61. With this configuration, the SPDT switch 61 allows a user to isolate faults in upstream and downstream network components without disrupting network communications. The mode converter 60 is used to efficiently couple light between a multimode network under test (NUT) and the single-mode interrogation network 56. The optical amplifier 59 is used to compensate for the low-tapping ratio of the tap coupler 62.

Figure 12:
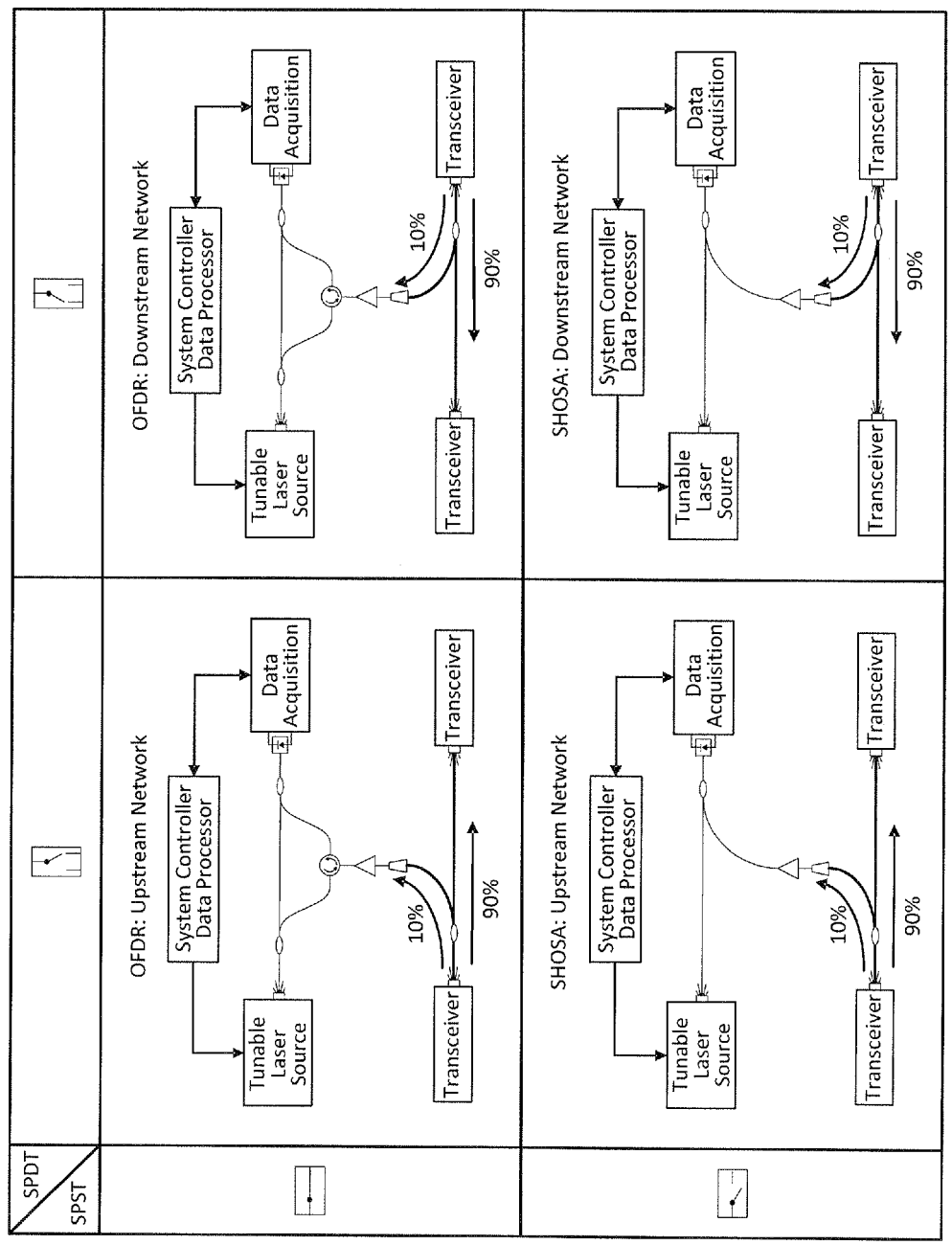
FIG. 12 is a table showing several example switch configurations and associated operational modes.

A summary of operational modes of the system described is depicted in FIG. 12 as a table showing several example switch configurations and associated operational modes.

Figure 13:
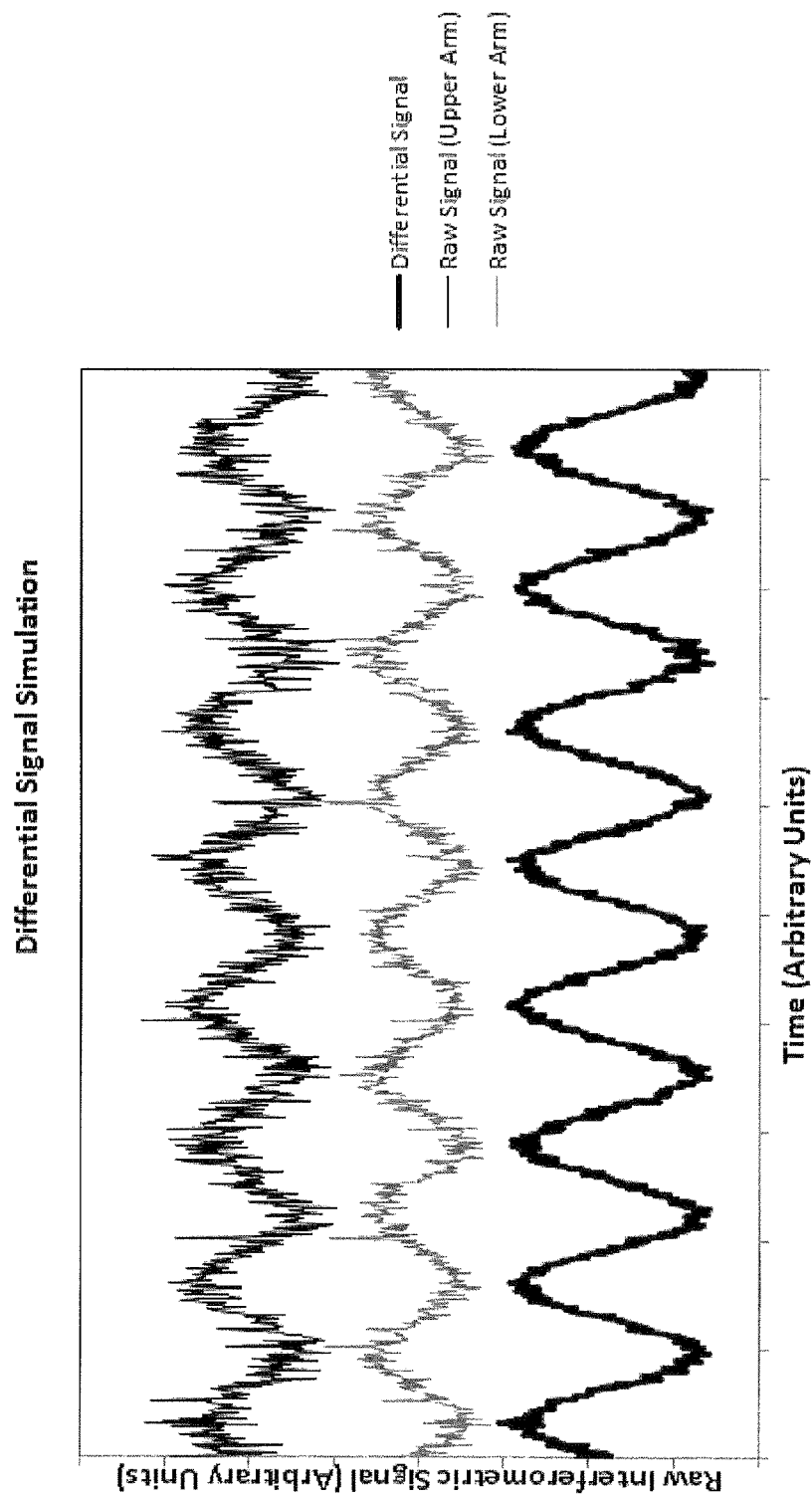
FIG. 13 is a graph showing noise cancellation through differential signal operation.

The system shown in FIG. 8 also contains a polarization-diverse differential detection configuration which is designed to monitor polarization-dependent loss and laser quality while cancelling electronic or other common noise sources. The noise-cancelling effect occurs due to a 180° phase shift imposed between the two output arms of the 2×2 mixing coupler 65. FIG. 13 shows a simulation of this effect. The simulated raw data is a sinusoidal interference signal that contains both optical and electronic noise, including a periodic impulse train commonly caused by power supply switching. By taking the difference between the signals from the two output arms of the mixing coupler 65, the common electronic noise is subtracted away, and the optical signal is amplified. Polarization controllers are installed in both arms of the mixing coupler 65 output in the interrogator network 56. An example process for alignment of the polarization controllers is as follows:

1) The SPST switch 42 is set to the open position and the interrogation system is disconnected from the NUT.
2) The polarization controller in the upper output arm of the mixing coupler 65 is adjusted to balance power on the S and P photodiode detectors of that arm during a sweep of the TLS 20. This ensures that power is evenly distributed on those detectors and the gain can be maximized without saturation.
3) The polarization controller in the lower output arm of the mixing coupler 65 is adjusted to match the power in the S states of the upper and lower arms during a sweep of the TLS 20. With proper alignment, P states are also matched.

Once the signals are properly aligned, a differential signal can be taken during subsequent OFDR or SHOSA measurements between the two S-state signals and between the two P-state signals. For measurement of total power (independent of polarization), the two differential signals are simply added.

The data acquisition circuitry 16 is shared between the two operational modes of the interrogation system 63. The acquisition bandwidth is preferably selected to balance performance between SHOSA and OFDR measurements. As discussed previously, the spectral resolution δv of a SHOSA measurement is determined primarily by the analog filter bandwidth $f_c$ of the acquisition circuitry 16:

$$\delta v = f_c \quad (6)$$

For OFDR measurements, the acquisition bandwidth affects the measurement spatial range $z_{max}$ according to equation (7):

$$z_{max} = \frac{f_o \lambda_o^2}{2nR} \quad (7)$$

where R is the wavelength scan rate of the TLS, n is the average group index of refraction of the NUT, and $\lambda_o$ is the center wavelength of the TLS scan. Thus by reducing the analog filter bandwidth to increase spectral resolution of SHOSA measurements, one also reduces the measurement range of OFDR measurements. This may be compensated in part by slowing down the scan rate of the TLS 20. An analog filter bandwidth of 20 MHz with an 80 MHz analog to digital converter (ADC) is a non-limiting example configuration. For OFDR measurements, the laser scan rate may be set for example to a scan rate of 100-200 nm/sec, providing a measurement range of 80-160 m for both upstream and downstream networks, allowing for interrogation of a maximum network length of 160-320 m. This non-limiting example may be suitable for interrogation of most fiber optic LANs. At these scan rates, the frequency of the TLS only increments by approximately 150-300 kHz during a digital clock cycle. Therefore, the SHOSA measurement is heavily oversampled with respect to the measurement resolution of 20 MHz. This oversampling is helpful in reliably extracting the beat frequency envelope during post-processing.

One example application for the combined SHOSA/OFDR interrogation device/system 63 is integration into high-speed multimode fiber optic communication networks. However, it will be appreciated that the combined SHOSA/OFDR interrogation system 63 may be integrated in a single-mode fiber optic network by removing the mode conditioner and using single-mode couplers and switch components. It will also be appreciated that the combined SHOSA/OFDR interrogation device/system 63 may be integrated in a free-space optical configuration by replacing the circulator and optical couplers with non-polarizing beam splitters and optical isolators to maintain the beam-path configuration described.

Figure 14:
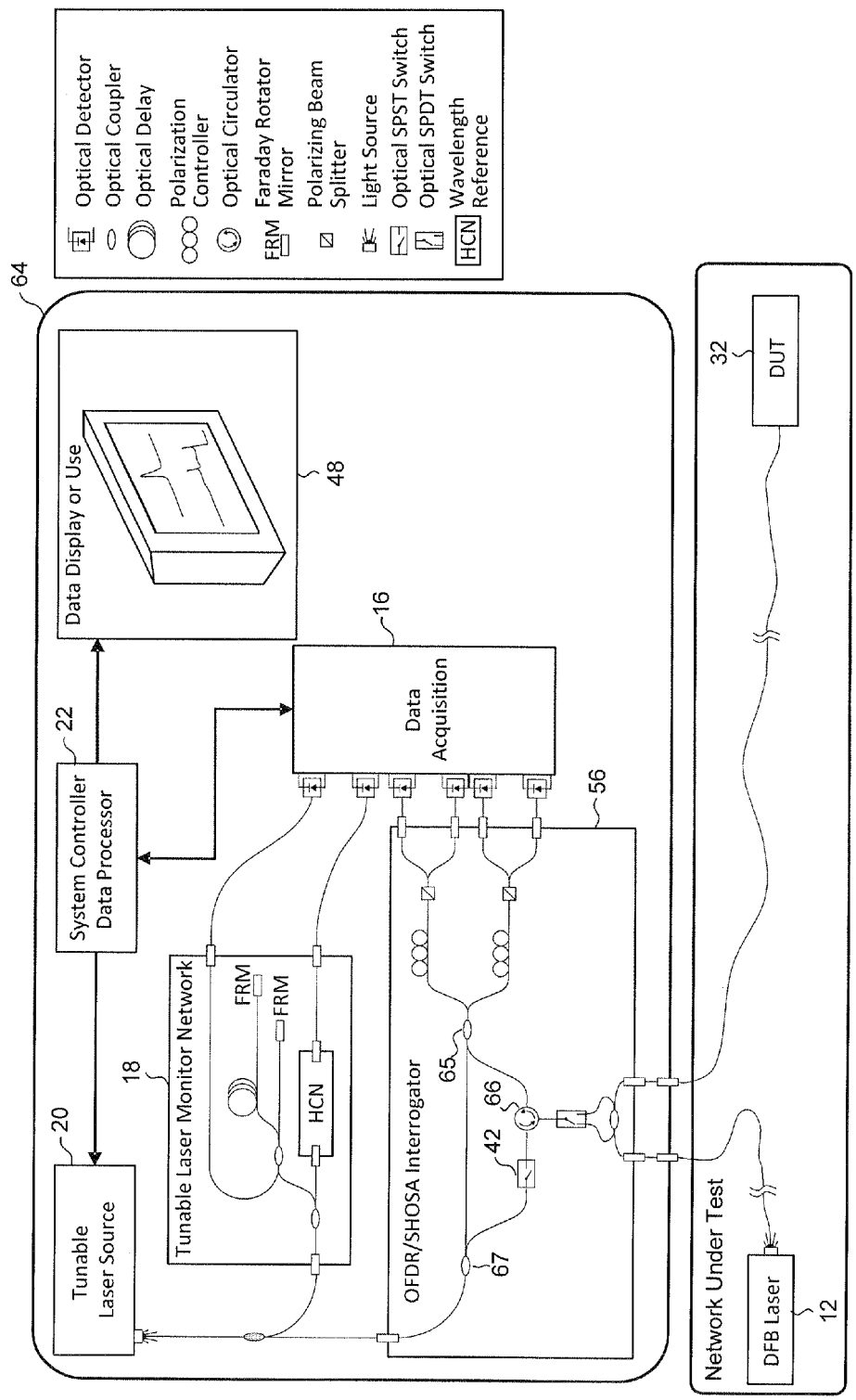
FIG. 14 is a non-limiting example embodiment of a combined SHOSA/OFDR interrogation system for in-line inspection of single-mode local optical communication networks.

A non-limiting example of a prototype combined SHOSA/OFDR interrogation device/system 64 depicted in FIG. 14 was built and tested. Test data were collected and are presented in FIGS. 15-19. The system 64 in FIG. 14 is similar to that 63 shown in FIG. 8 but is designed for interrogation of single-mode optical networks, so a mode converter is not present. In addition, the tap coupler of the prototype system has a large tapping ratio (50%), so an optical amplifier is unnecessary and was excluded. Data was acquired with a 20 MHz analog filter bandwidth with an 80 MHz ADC. The prototype system has a maximum OFDR measurement range of 160 m for both upstream and downstream interrogation, of which only 32 m was used. On the upstream side, the system was connected to a distributed feedback laser (DFB) 12, which is tunable in the C-band through an adjustable current source. The SPDT switch 42 was positioned to interrogate the DFB laser and the associated network leading to the DFB source. Both OFDR and SHOSA graphs are shown with a decibel scale relative to the interrogating TLS 20 power.

Figure 15:
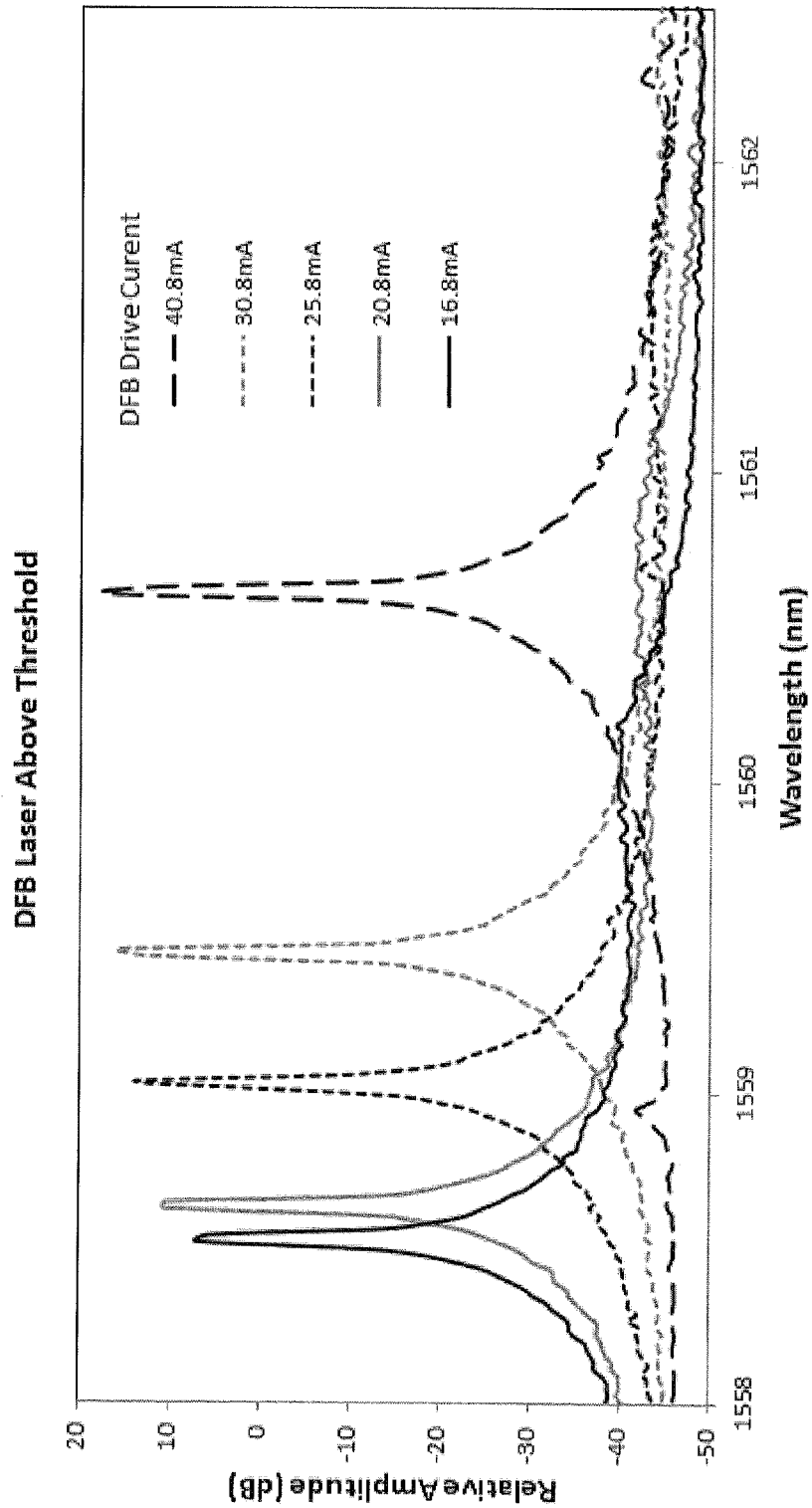
FIG. 15 is a graph showing example SHOSA measurements of a distributed feedback (DFB) laser in normal operation.

FIG. 15 shows example SHOSA measurements of the DFB laser in normal operating conditions. The graph shows measurements with a driver current of 16.8 mA, 20.8 mA, 25.8 mA, 30.8 mA, and 40.8 mA. The associated center wavelength of the line was measured to be 1558.53 nm, 1558.64 nm, 1559.04 nm, 1559.46 nm, and 1560.62 nm. Over this range, the peak amplitude increased from 6.8 dB to 17.3 dB, and the line narrowed from 3.29 pm to 2.23 pm FWHM.

Figure 16:
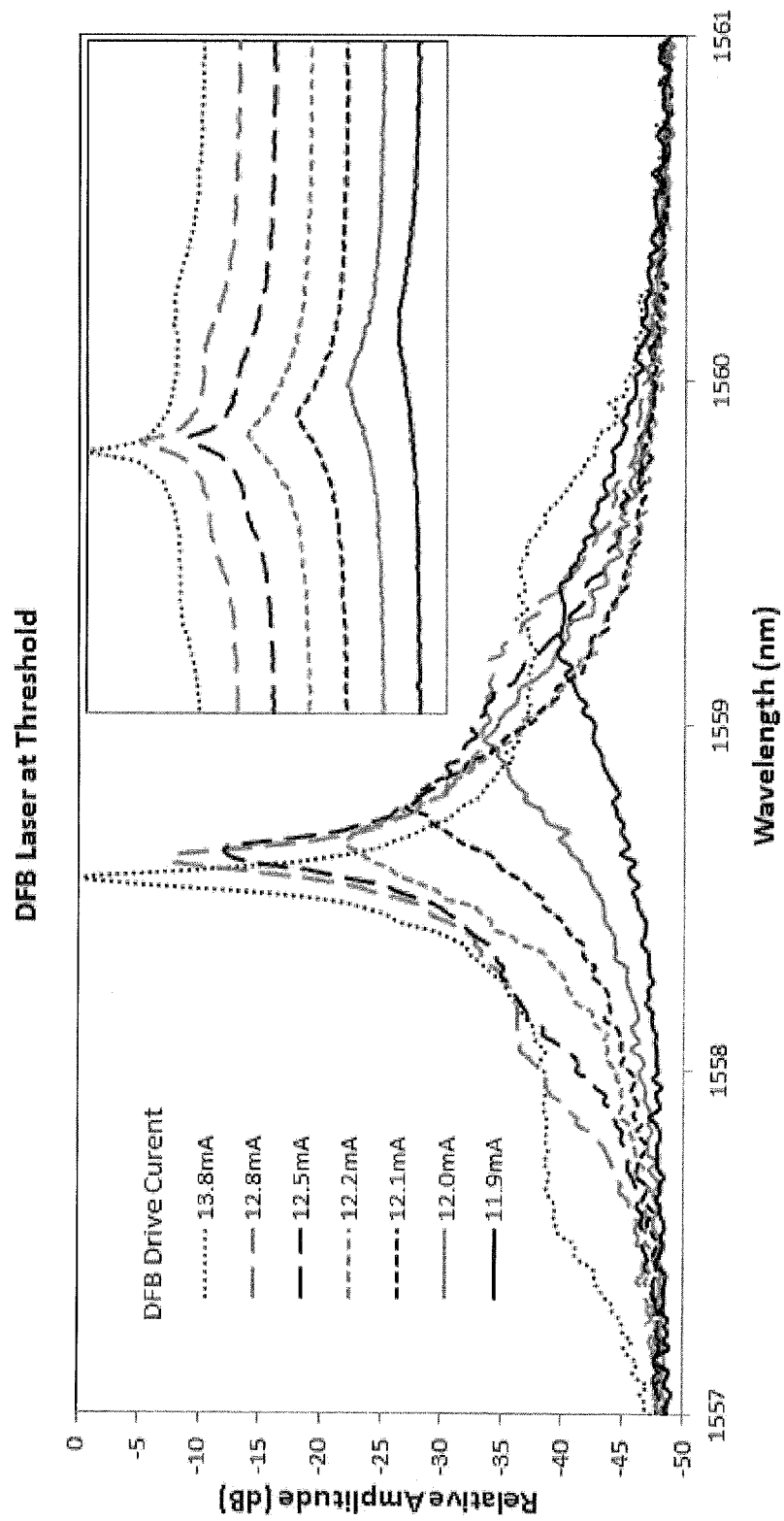
FIG. 16 is a graph showing example SHOSA measurements of a distributed feedback (DFB) laser near lasing threshold and an inset showing a stacked graph with arbitrary offset.

FIG. 16 shows SHOSA measurements highlighting the DFB spectral characteristics near the lasing threshold condition. The graph shows measurements with a driver current of 11.9 mA, 12.0 mA, 12.1 mA, 12.2 mA, 12.5 mA, 12.8 mA, and 13.8 mA. Notice that the tuning characteristics are reversed in this regime, moving to shorter wavelengths from 1559.22 nm to 1558.56 nm as the drive current is increased. Also, the linewidth narrows dramatically from 258 pm to 5.17 pm, while the peak amplitude increases from −40 dB to 5.2 dB. (Data in the graphs has been decimated heavily for ease of display. This operation can cause the apparent displayed peak maximum to be incorrect. Values for linewidth, center wavelength, and peak amplitude were calculated before decimation.) The SHOSA measurements also show a broader skirt that becomes evident at 12.5 mA and decreases at higher currents.

Figure 17:
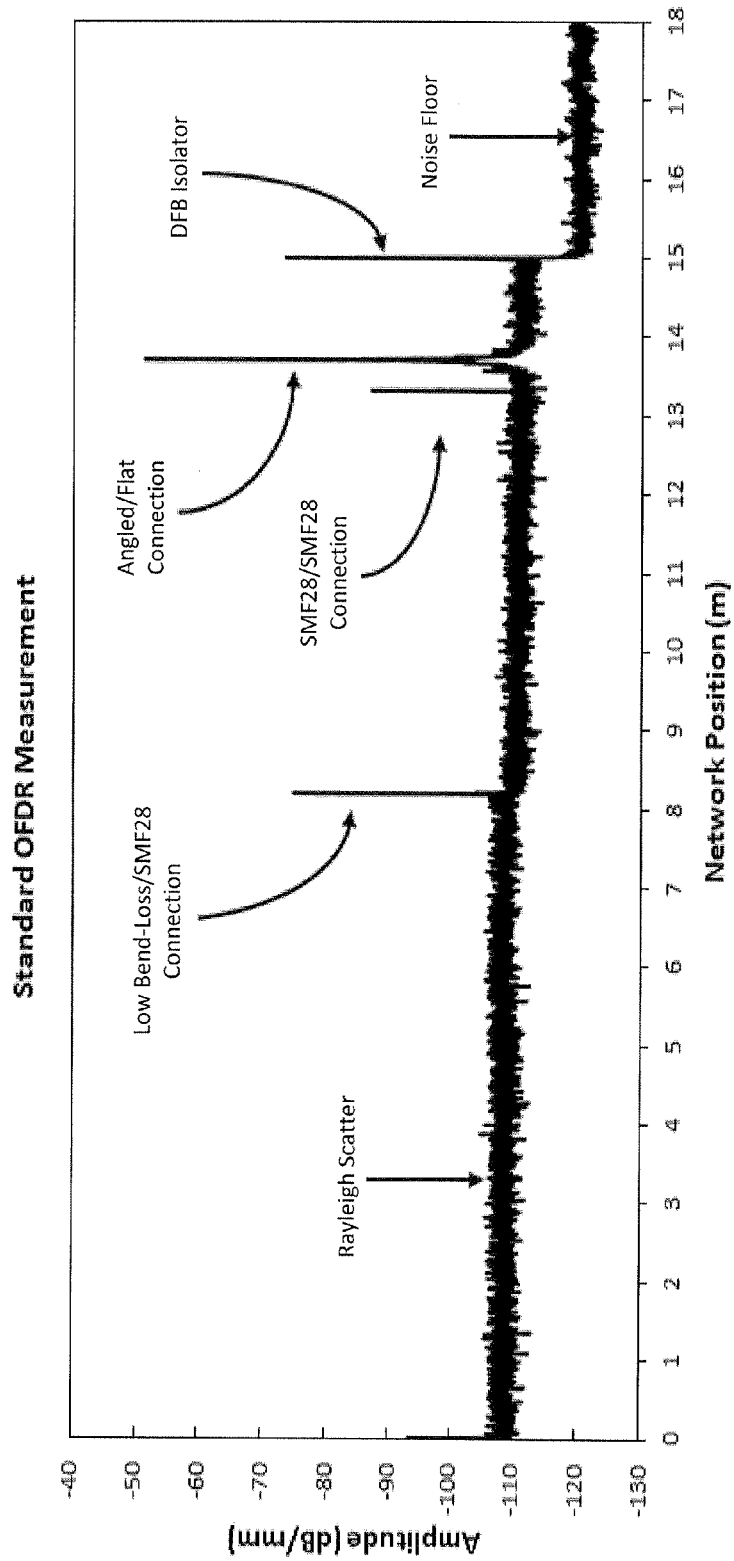
FIG. 17 is a graph showing example OFDR measurements of standard optical network.

FIG. 17 shows an OFDR measurement of scatter amplitude in the optical network leading to the DFB laser 12. The plot illustrates typical loss characteristics in the network under normal operating conditions. From the interrogator 56 unit, there is approximately 8.1 m of high numerical aperture (high NA) low-bend-loss fiber connected to approximately 5.2 m of Corning SMF28. The junction between these two fiber types shows a sharp reflection and approximately 3 dB of insertion loss at the connector. This drop in amplitude is a result of the increased Rayleigh scatter level in the high NA fiber. Afterwards, there is a connection to a small SMF28 jumper, which is then connected to the lead fiber of the DFB laser unit. This latter connection shows a strong and broad reflection which is a result of joining two different types of optical connectors; the SMF28 jumper is terminated with a FC/APC (angled) connector, while the DFB lead is terminated with a FC/PC (flat) connector. The last reflection shown in the plot is from the optical isolator inside the DFB unit, after which no signal is detected and the scatter amplitude drops to the noise floor at approximately −122 dB/mm.

Figure 18:
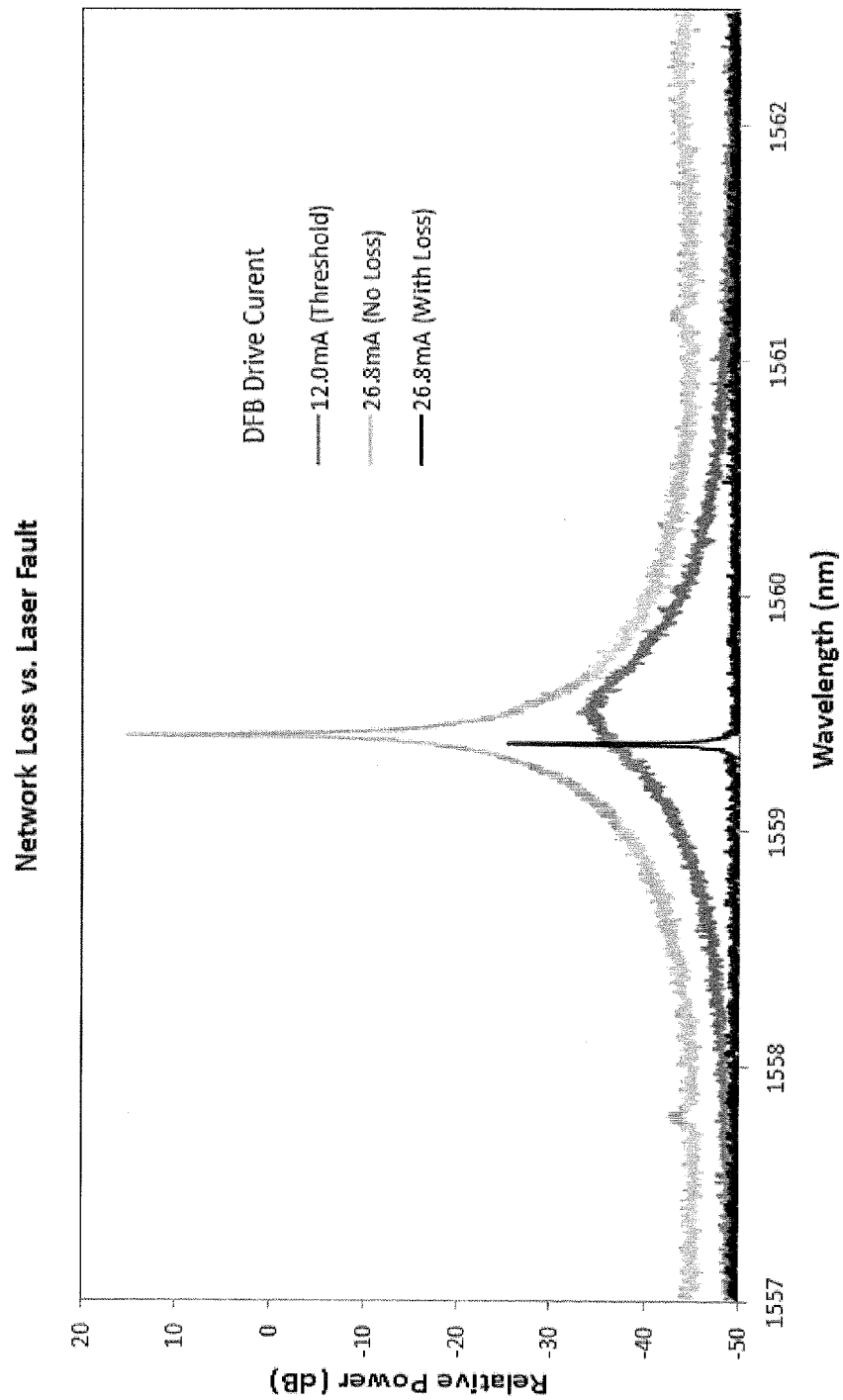
FIG. 18 is a graph showing example SHOSA measurements of a distributed feedback (DFB) laser highlighting capability to distinguish between network and source faults.

FIG. 18 shows an example that highlights the ability to distinguish between fault sources based on SHOSA measurement. The figure shows three separate measurements of the DFB laser. The first plot (shown in dark grey) shows the DFB laser line at threshold operation (12.0 mA), with a characteristic broad linewidth of 135.8 pm and low amplitude of −34.7 dB. The second plot (shown in light grey) shows the line at normal operation (26.8 mA), with a narrow linewidth of 2.41 pm and peak amplitude of 13.5 dB. For the third measurement (shown in black), a fault was intentionally placed into the network leading up to the DFB laser: A portion of the low-bend-loss lead near the front panel of the interrogation unit was wrapped tightly around a mandrel approximately 5 mm in diameter to induce significant bend-loss. The resulting SHOSA measurement shows a significant drop in amplitude, down to −27 dB. However, the linewidth remains narrow at 2.45 pm, indicating that the laser source is operating normally. FIG. 18 highlights the spectral characteristics associated with two separate fault sources in a fiber optic communications network: source failure (line broadening, shown in dark grey) and network failure (amplitude drop, shown in black).

FIG. 18 shows how information provided by a combined SHOSA/OFDR measurement can be used to troubleshoot both network and source faults. For instance, if the network source under normal operating conditions operated with a linewidth of 2 pm±1 pm and an amplitude of 10 dB±5 dB, a network maintainer or software program could identify that the weak (−27 dB) but narrow (2.45 pm) laser line shown in black in FIG. 18 exhibited a linewidth that was commensurable with standard operating specifications of the source but was well below standard output power. Because a network fault (fiber break, etc.) can induce loss but cannot effect the linewidth of the laser source, and because a laser failure generally produces an associated broadening or drift in the laser wavelength, it is correct to assume that the SHOSA measurement described above is indicative of a network fault. In that case, the network sources would be disabled, the interrogation system would be reinitialized in OFDR mode and an OFDR measurement would be made to verify that the nature of the anomalous SHOSA measurement is indeed a network fault and to precisely locate the position of that fault.

Figure 19:
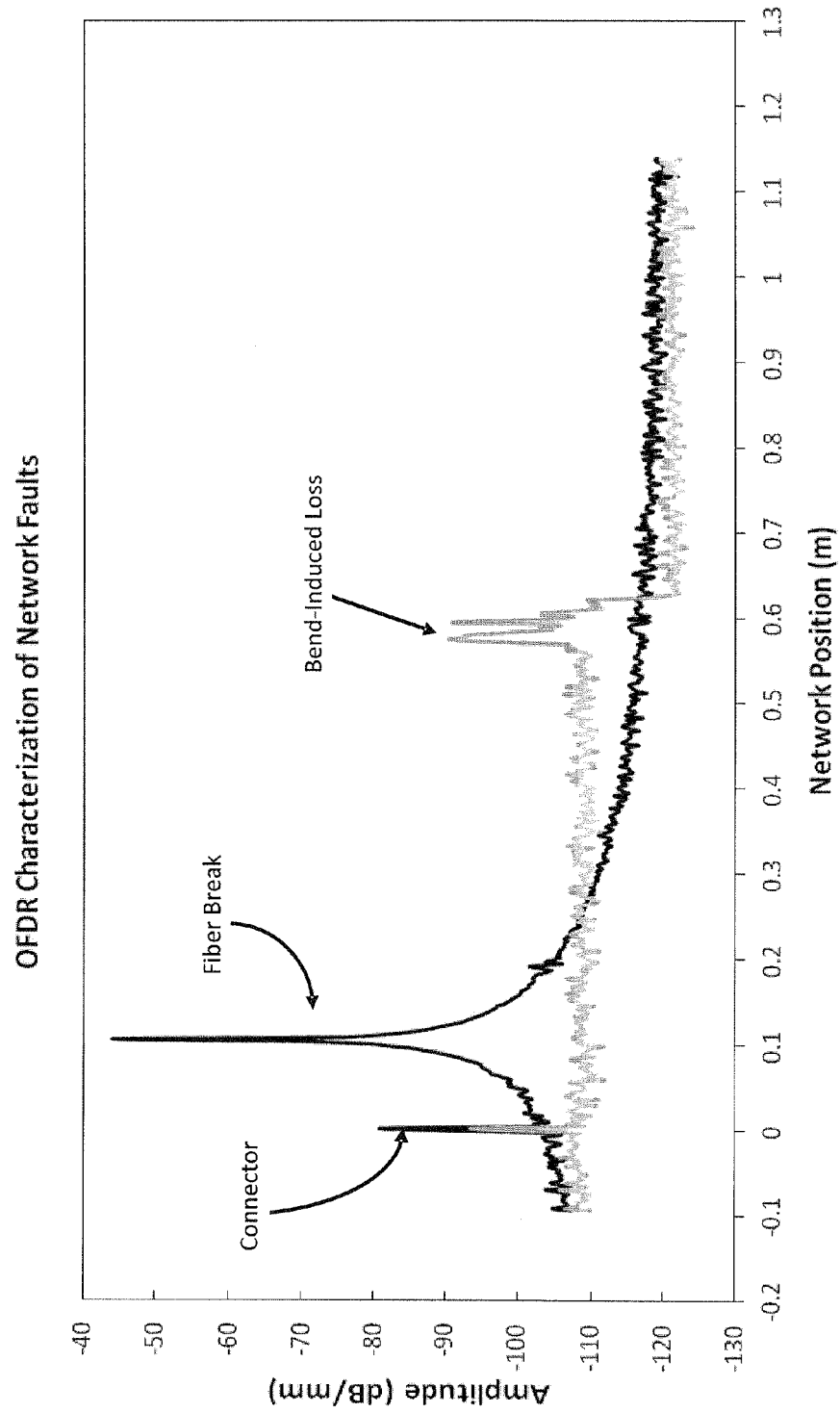
FIG. 19 is a graph showing example OFDR measurements highlighting capability to distinguish and characterize different network faults.

FIG. 19 shows two OFDR measurements highlighting the ability to distinguish between network fault sources. The first measurement (shown in light grey) was taken with the faulty network configuration used to produce the low-amplitude/narrow-linewidth plot shown in black in FIG. 18. The loss region shows a broad distribution with relatively low scattering amplitude, which is characteristic of bend-induced loss. The second plot (shown in black) of FIG. 19 shows a more dramatic loss source: a broken fiber. This fault shows a characteristic strong reflection and associated broadening. Also included in both plots of FIG. 19 is a reflection from the front panel of the interrogation unit. The high spatial resolution associated with the OFDR technique allows the user to both localize and characterize network fault sources.

Using commercially available components and relatively low-bandwidth electronics, the above-described non-limiting prototype provides SHOSA resolution of better than 160 fm and an OFDR measurement range greater than 160 m. In this non-limiting example prototype, the addition of a SPDT optical switch, a mode converter, a tap coupler, and an optical amplifier would allow the system to be installed in-line, providing the two-fold measurement capability for existing fiber optic LANs at least 320 m long.

The data presented above illustrates just a few examples of the improved trouble-shooting capabilities that the described technology provides to network maintainers and technicians. The integrated SHOSA/OFDR device can provide network maintainers with critical decision-making information that would be otherwise ambiguous or unavailable with either one of the SHOSA or OFDR subcomponents alone. By utilizing a common interrogation source, a common reference interferometer path, and common acquisition hardware, a combined OFDR/SHOSA device is achieved where a user can choose between operational modes, e.g., through a simple SPST fiber optic switch. The single OFDR/SHOSA device has broader range of applications, takes up less space, and is significantly less costly than the total cost of two different devices.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology described, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. A device for optical network loss measurements and light source characterization, comprising:
    a single optical interrogation system including an interrogating laser source, an optical interferometric interrogator network, and optical detection circuitry; and
    an operational mode controller arranged to permit selective configuration of the single optical interrogation system to perform optical frequency-domain reflectometry (OFDR) in a first operational mode and to perform swept-heterodyne optical spectrum analysis (SHOSA) in a second operational mode.

2. The device in claim 1, wherein the operational mode controller corresponds to a first optical switch in the optical interferometric interrogator network, which when switched to a first state, selects the first operational mode, and when switched to a second state, selects the second operational mode.

3. The device in claim 2, wherein the optical interferometric interrogator network includes a reference optical path and a measurement optical path coupled to a device under test, and wherein the optical switch is configured to couple the interrogating laser source to the device under test via the measurement path in the first operational mode and to disconnect the measurement path between the interrogating laser source and the device under test in the second operational mode.

4. The device in claim 3, wherein the optical interferometric interrogator network includes two input/output ports joined to the interferometric network via a 2×2 bidirectional tap coupler and a second optical switch.

5. The device in claim 4, wherein the two input/output ports are connected to two opposite leads of the 2×2 bidirectional tap coupler, and a remaining two leads of the 2×2 bidirectional tap coupler are connected to the second optical switch.

6. The device in claim 4, wherein the 2×2 bidirectional tap coupler is connected to the input/output ports such that a majority of the power entering either input/output port from outside of the device continues on to the opposite input/output port to permit the device to be connected in-line with a communications network while tapping a minority of that power.

7. The device in claim 6, wherein the majority of the power is 80% or greater of the power and the minority of the power is 20% or less of the power.

8. The device in claim 6, wherein the second optical switch is a single-pole, double-throw (SPDT) switch, and a portion of light from either input/output port is connected to one of the two throws of the SPDT switch, with one input/output port being connected to one throw and the opposite input/output port being connected to the opposite throw to allow a user to probe two different input light sources and/or networks from opposite input/output ports by selecting a corresponding switch position of the SPDT switch.

9. The device in claim 1, wherein the optical interrogation system includes a system controller, coupled to the interrogating laser source and the optical detection circuitry, and a display or data output interface coupled to the system controller.

10. The device in claim 1, wherein the optical interrogation system includes a tunable laser monitor network coupled to the interrogating laser source and the optical detection circuitry.

11. The device in claim 1, wherein the device is contained in a single housing.

12. A method for optical network loss measurements and light source characterization, comprising:
    providing a single optical interrogation device to perform optical frequency-domain reflectometry (OFDR) in a first operational mode and to perform swept-heterodyne optical spectrum analysis (SHOSA) in a second operational mode, wherein the optical interrogation device includes an interrogating laser source, an optical interferometric interrogator network, and optical detection circuitry;
    selecting one of the operational modes; and
    making optical network loss measurements or characterizing a light source using the single optical interrogation device based on the selected operational mode.

* * * * *